Patented June 24, 1930

1,765,485

UNITED STATES PATENT OFFICE

CARL G. HASSELBLAD, OF GROSSE POINTE, AND AIMEE J. CATELLIER, OF DETROIT, MICHIGAN

METHOD OF COATING SAUSAGES AND SMOKED OR COOKED MEATS

No Drawing.   Application filed April 28, 1928.   Serial No. 273,766.

This invention aims to provide a method of coating sausages and cooked or smoked meats so that a protective coating is formed over their outer surfaces.

Some of the objects of the invention are to provide a protective coating: that is edible and does not affect the flavor of the meat; that will permit the latter to be kept without deterioration for longer periods than uncoated meats; that renders the goods practically immune from discoloration or mold; that helps to retain the color and flavor; that minimizes shrinkage; and that is eminently sanitary in so much that the goods may be washed off with warm water without fear of their becoming sodden.

Another object of the invention is to provide a simple and effective protective coating consisting merely of dipping the sausage or meat into warm fluid gelatine and drying the dipped goods in such a manner that a coating of substantially uniform thickness completely encases the goods; moreover the finished coating is such that it is not liable to peel, chip or rub off in ordinary handling.

Having thus briefly enumerated some of the objects and advantages of the invention, we will now proceed to describe it in detail.

Firstly an edible gelatine is obtained. This is generally made of pork rinds, cut up or ground, and boiled in water until a gluey substance of the required density is obtained. The rind and water are originally in the ratio of about 2 to 1 by weight. During and subsequent to boiling practically all grease and fat is removed. The density of the gelatine utilized depends upon the purpose for which it is to be employed. For hams and meats where portions at least of the meat are not protected by rind or skin a heavier gelatine is preferable, whereas for sausages protected by skins less dense gelatine may be used. In the latter case quite thin gelatine may be employed since the skin prevents any noticeable penetration into the meat. Moreover for reasons hereinafter stated about 2% of sugar is sometimes added to the rind prior to boiling.

The meats or sausages are dipped momentarily into the heated gelatine and dried. The drying process, after the goods have once been chilled, must be gradual in order to maintain an even thin coating over the whole surface of the goods. Moreover this coating should be hard and not appreciably greasy to the touch. In order to accomplish this the goods should be chilled immediately, either by being subjected to cold air, from 32 to 40 degrees Fahrenheit, or by being immersed momentarily in cold water. The object of this is to chill the gelatine and reduce its fluidity. The goods are then introduced into a low heat so that some of the moisture in the gelatine is evaporated. The time during which the low temperature is applied varies according to the density of the gelatine; it is generally from one to two hours. Then a higher heat is used until the coating has dried and hardened. The low and high temperatures are approximately 70 degrees and 140 degrees Fahrenheit respectively. If the low temperature is not first applied it is found that the coating does not remain even, and that some portions of the goods are more or less bare, and on others thick lumps of gelatine collect. This is due to the "boiling" of the gelatine that occurs on the somewhat greasy surface of the goods before sufficient moisture has been eliminated to render the gelatine sufficiently tacky to hold together in one continuous sheet.

In the case of smoked goods, either sausages or meats, dipping may be done prior to smoking, in which case it is found that shrinkage during smoking is materially reduced. The first part of the smoking is accomplished with "cold smoke" at approximately the same heat as the low temperature already referred to, and after a period of an hour or more, when the gelatine has become sufficiently tacky, "hot smoke", at a temperature substantially the same as the high temperature referred to, is utilized. It is found that the coating, particularly before it has hardened, does not retard the smoking operation to any appreciable extent. In the case of "tied goods", such as salami sausage, the gelatine also holds the string in place so that cut portions of the sausage look neater when lying on the counter.

When the surface of the goods to be coated is exceptionally greasy the small percentage of sugar already referred to assists in preventing the gelatine from "boiling" or collecting in globules, on the surface of the goods as it dries. A coating formed in this manner is quite satisfactory, though slightly harder and slightly less elastic. In a large variety of goods it may be employed but in certain cases it is not desirable on account of the flavor of sugar encountered when the coating is eaten with the goods themselves.

While in the foregoing the preferred method of applying a coating to sausages and cooked or smoked meats has been described, it is understood that the process is subject to such modifications as fall within the scope of the appended claims.

What we claim as our invention and desire to secure by Letters Patent is:

1. A coating process for sausages and meats consisting of covering the goods with warm fluid gelatine, subjecting the goods to a cold temperature slightly above freezing for a short period to reduce the fluidity of the gelatine and then drying them in two stages at two different and relatively higher temperatures.

2. A coating process for sausages and meats consisting of covering the goods with warm fluid gelatine, subjecting the goods immediately to a cold temperature for a short time to reduce the fluidity of the gelatine, then submitting the goods to a low heat so that part of the moisture in the gelatine becomes evaporated, and finally subjecting the goods to a higher heat to dry the gelatine.

3. A coating process for sausages and meats consisting of covering the goods with warm fluid gelatine, subjecting the goods immediately to a low temperature for a short time, said low temperature being close to but slightly above freezing, then submitting the goods for a period of an hour or more to a temperature of above 70 degrees Fahrenheit, and drying the goods in a higher heat of approximately 140 degrees Fahrenheit.

4. A coating process for smoked sausages and meats consisting of covering the goods with warm fluid gelatine, and subjecting the goods first to cold smoke and subsequently drying them in hot smoke.

5. A coating process for smoked sausages and meats consisting of covering the goods with warm fluid gelatine, exposing them immediately thereafter to a cold temperature, then subjecting the goods to a cold smoke, and finally drying and hardening the gelatine by exposing the goods to hot smoke.

CARL G. HASSELBLAD.
AIMEE J. CATELLIER.